United States Patent [19]

Young

[11] 4,323,128

[45] Apr. 6, 1982

[54] SPRING ADJUSTMENT SYSTEM FOR DRILL STRING TOOL

[75] Inventor: James W. Young, Irving, Tex.

[73] Assignee: Dresser Industries, Inc., Dallas, Tex.

[21] Appl. No.: 878,200

[22] Filed: Feb. 16, 1978

Related U.S. Application Data

[63] Continuation of Ser. No. 710,754, Aug. 2, 1976, abandoned.

[51] Int. Cl.$^3$ ............................................. E21B 17/07
[52] U.S. Cl. ...................................... 175/57; 175/320; 267/162
[58] Field of Search .................. 173/120; 175/299, 57, 175/321; 267/162, 137, 125; 81/57.38; 85/32 X; 188/196 M

[56] References Cited

U.S. PATENT DOCUMENTS

| | | | |
|---|---|---|---|
| 2,020,927 | 11/1935 | Arnold et al. | 267/162 |
| 2,704,426 | 3/1955 | Macauley | 85/32 R X |
| 2,937,721 | 5/1960 | Parret | 188/196 M |
| 3,873,079 | 3/1975 | Kuus | 267/162 |
| 3,898,815 | 8/1975 | Young | 175/321 |

Primary Examiner—William F. Pate, III
Attorney, Agent, or Firm—Fred A. Winans; Eddie E. Scott

[57] ABSTRACT

A torque transmitting drill string tool is provided that includes an outer member and an inner member telescopically arranged. Spline means between said outer member and said inner member transmits torque. A spring means is positioned between the outer member and the inner member. Means are provided for adjusting the position and/or pre-load of the spring means without disassembling the tool.

2 Claims, 2 Drawing Figures

SPRING ADJUSTMENT SYSTEM FOR DRILL STRING TOOL

This is a continuation, of application Ser. No. 710,754, filed Aug. 2, 1976, now abandoned.

BACKGROUND OF THE INVENTION

The present invention relates to the art of earth boring, and more particularly to a torque transmitting well tool with means for externally adjusting the spring means. The present invention is adapted for use in the drilling of oil wells, gas wells including mining and all drilling operations and the like and particularly to telescoping tools used in connection therewith. Such tools generally include an elongated outer member having a longitudinal bore therethrough and an elongated inner member telescopically mounted in this bore. The outermost end of each member is provided with conventional connecting means so that the tool can be disposed in a string or drill rod or pipe with one member connected to the upper portion of the string above the tool and the other member connected to the lower porton of the string beneath the tool. Limiting means are provided to limit the axial movement of one member with respect to the other in either direction; the distance it is permitted to move is known as the "stroke" of the tool. The tool transmits torque and the two members are splined so that relative axial movement between them is permitted while relative rotation is prevented.

One such type of telescoping tool is commonly referred to as a "bumper sub" or "impact tool" because the limiting means is comprised of two sets of opposed shoulders one of which becomes engaged or "bumps" when the moving member reaches either end of tis stroke. Bumper subs are often used to provide an upward and/or downward hammering action of relatively small magnitude or to allow a drill string to accommodate the rise and fall of a ship in offshore drilling.

Still another type of telescoping tool, often referred to as a shock or percussion tool is provided with resilient means which resist relative axial movement of the two members and provide a cushioning effect against shock. During the drilling of an oil well by the rotary method, it has become common practice to provide a section of drill collars above the drill bit. The section of drill collars provides the desired weight on the bit during drilling. The drill pipe above the section of the drill collars is generally in tension. This allows a relatively constant weight to be applied to the bit during drilling. When the hole is being started from the surface, the section of drill collars cannot be used because the length of the drill string is insufficient. A much smaller weight is therefore applied to the bit during drilling near the surface.

The action of the bit during drilling transmits shock forces to the drill string. The shock forces can be quite damaging to elements of the drill string and to drilling equipment at the surface. Drill string shock absorbers are commonly placed in the drill string to absorb the shock forces. A drill string shock absorber generally includes telescopically related parts that are separated by a spring means. The prior art shock absorbers have worked effectively with the full drilling weight on the bit. However, the prior art shock absorbers have not been effective during drilling near the surface because the weight on the bit is only a fraction of the weight on the bit at deeper depths. The spring means in the prior art shock absorbers has been too heavy to be effective during drilling near the surface.

There are other types of telescoping tools, e.g. some which combine some of the features of the tools discussed above. The previous methods of adjusting the spring settings, i.e. preload for shock absorbers and hammer-anvil gap settings for impact tools, involved tool disassembly and spring adjustment by the use of various width spacers.

DESCRIPTION OF THE PRIOR ART

In U.S. Pat. No. 3,383,126 to A. H. Salvatori et al, patented May 14, 1968, a drill string shock absorber is shown. The drill string shock absorber is adapted to be inserted into a rotary drill string to absorb vibrational and shock forces therein. The shock absorber includes telescopically related parts which are separated and isolated one from the other by a mass of compressible wire material.

In U.S. Pat. No. 2,585,995 to C. C. Brown, patented Feb. 19, 1952, a drilling joint is shown. The drilling joint provides an improved means for controlling the weight applied to the drill bit, localizes the neutral point in the drill stem, and prolongs the life of the drill stem by absorbing or damping out vibrations and other shocks imparted to the drill stem during operations.

In U.S. Pat. No. 2,991,635 to F. D. Warren, patented July 11, 1961, a resulient drilling tool is shown. The drilling tool comprises a pair of tubular housings or pipes telescoped together and provided with cooperating splines to transmit torque from one housing to the other. A plurality of helical springs are anchored in the annulus between the two telescoped housings to constantly urge the housings in opposite directions and effectively dampen any vibration of the drill string in which the tool is interposed.

In U.S. Pat. No. 3,871,193 to James Whitehurst Young, patented Mar. 18, 1975, a shock absorbing torque transmitting well tool is disclosed that includes an outer member and an inner member telescopically arranged. A spline means between said outer member and said inner member transmits torque. A spring means is positioned between the outer member and the inner member. The spring means includes a multiplicity of spring segments arranged in discrete spring units having different spring rates. The spring means will accommodate a wide range of loads or rapidly varying load situations. The tool operates effectively in holes started from the surface with very little weight on the bit and continues to operate effectively as the weight on the bit is increased.

In U.S. Pat. No. 3,884,051 to Clifford C. Bottoms, patented May 20, 1975, a tool is disclosed that comprises an elongated outer member having a longitudinal bore therethrough and an elongated inner member telescopically mounted therein. A plurality of rotating antifriction bearings are provided between the two members to guide them in their telescopic movement. The bearings have axes of rotation which are disposed normal to the longitudinal axis of the inner member and which are fixed relative to one of the members. Limiting means are provided limiting the axial movement of the outer member relative to the inner member in either direction.

In U.S. Pat. No. 3,898,815 to James Whitehurst Young, patented Aug. 12, 1975, a reciprocating torque transmitting well tool is disclosed that includes an outer member and an inner member telescopically arranged.

A spline means between said outer member and said inner member transmits torque. A spring means is positioned between the outer member and the inner member. A first seal means provides a fluid seal between said outer member and said inner member. A second seal means spaced from said first seal means provides a fluid seal between said outer member and said inner member. At least one of said seal means can move axially between said outer member and said inner member. The axial movement of the seal means accomplishes at least two functions. The first function is that as the external pressure increases, the seal means can move inwardly to compress any trapped air to the point that a pressure balance is maintained at all times. The second function is to accommodate variations in volume created by the drive mandrel as it moves axially within the tool housing.

SUMMARY OF THE INVENTION

The present invention provides a more convenient and accurate method of adjusting the position and/or pre-load of a spring system used in drill string shock absorbers or impact-type drilling tools. The need to adjust the spring system varies with operating conditions. The tool may require numerous spring settings as different formations are encountered. The ability to adjust the tool spring system externally eliminates the need of tool disassembly for this purpose. The torque transmitting well tool of the present invention includes an outer member and an inner member, said outer member and said inner member being telescopically arranged. Spline means are provided between said outer member and said inner member for transmitting torque. The spring system is provided connecting said outer member and said inner member.

In one embodiment of the invention a traveling nut system is located in the end of the spring sub of the torque transmitting well tool. The traveling nut has an integral gear wheel which is exposed to a threaded access opening in the spring sub. The positioning of the traveling nut is accomplished by removing a sealed, threaded plug from the access opening, installing a threaded bushing to protect the access hole threads during adjustment and engaging the gear tooth portion of the nut with a flat or round-end pry bar which allows for sufficient leverage to rotate the nut for proper positioning. A pre-calculated tabulation will reveal the number of gear teeth to engage in order to advance or retract the nut to the proper position. After achieving the proper adjustment, the threaded bushing is removed and the sealed, threaded plug is installed to close the access opening and engage the gear teeth in order to lock the traveling nut in place.

The above and other objects and advantages of the present invention will become apparent from a consideration of the following detailed description of the invention when taken in conjunction with the drawings.

DETAILED DESCRIPTION OF THE INVENTION

Figure 1:
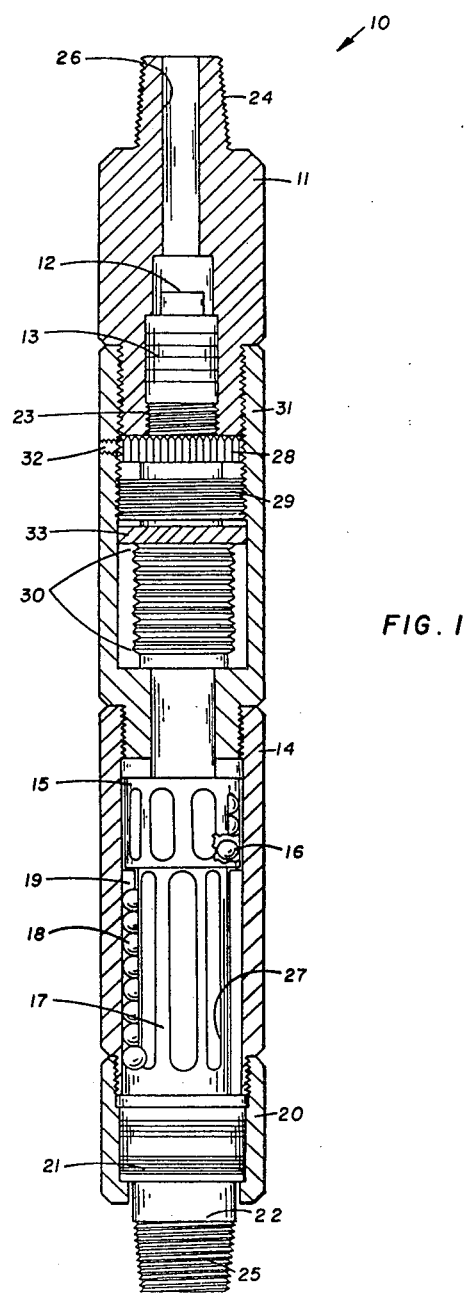
FIG. 1 is a longitudinal view, partly in section and partly in elevation, of one embodiment of a drill string tool constructed in accordance with the present invention.

Referring now to the drawings and in particular FIG. 1, a drill string tool is shown therein and generally designated by the reference number 10. The tool 10 is adapted to be positioned between a drill bit (not shown) and the section of the drill string that connects the drill bit to the drilling equipment at the surface. The tool 10 maintains a spring force coupled into the drill string assembly in such a manner that shock loads resulting from the action of the bit are absorbed and prevented from being transmitted up the drill string. The tool 10 minimizes fatigue on the drill bit, the drill string, and the surface equipment.

The tool 10 includes an upper packer sub 11. The upper packer sub 11 is adapted to be connected to the portion of the drill string extending from the surface equipment. The threaded connection 24 allows the tool 10 to be easily connected to and disconnected from the drill pipe. The upper packer sub 11 is threaded into a spring sub 31 and the spring sub 31 is threaded into a spline sub 13. The spline sub 14 is threaded into a lower packer sub 20. A drive shaft mandrel 22 fits within the lower packer sub 20, the spline sub 14, the spring sub 31, and the upper packer sub 11. The drive shaft mandrel 22 includes a threaded connection 25 for connecting the drive shaft mandrel 22 to the bit. The drive shaft mandrel 22 has limited movement within the lower packer sub 20, the spline sub 14, the spring sub 31, and the upper packer sub 11. Drilling fluid is transmitted through the tool 10 during drilling. Drilling fluid enters the passage 26 in the upper packer sub 11 from the section of drill string above the tool 10. The drilling fluid continues through a central passage in the wash pipe 12, through a central passage in the drive shaft mandrel 22, and is transmitted to the section of the drill string below the tool 10.

Upper packer seals 13 provide a dynamic fluid seal between the upper packer sub 11 and the wash pipe 12 and drive shaft mandrel 22. Lower packer seals 21 provide a dynamic fluid seal between the lower packer sub 20 and the drive shaft mandrel 22. The enclosed area between the upper packer seals 13 and the lower packer seals 21 is filled with a lubricating oil. A ball spline 15 on the drive shaft mandrel 22 is located between the upper packer seals 13 and the lower packer seals 21. The ball spline 15 includes a series of carrier balls 16 that reduce friction and facilitate relative longitudinal movement of the drive shaft mandrel 22 and the housing consisting of the upper packer sub 11, the spring sub 31, the spline sub 14, and the lower packer sub 20. A ball spline 17 is positioned between the drive shaft mandrel 22 and the spline sub 14 to transmit torque from the housing consisting of the upper packer sub 11, the spring sub 31, the spline sub 14, and the lower packer sub 20. The ball spline 17 includes a series of carrier balls 18 that transmit torque between spline grooves 27 connected to the drive shaft mandrel 22 and spline grooves 19 connected to the spline sub 14.

A spring unit 30 is positioned between the upper packer sub 11 and the lower end of the spring sub 31. The spring unit 30 absorbs the shock loads resulting from the action of the bit. The spring unit 30 consists of disc or "Belleville" springs. The shock forces resulting from action of the bit may also be affected by a swabbing or damping action brought about by restricting the escape of the lubricant trapped between the springs 30.

The geometry of the springs allows them to reduce in I.D. and expand in O.D. as loads are applied. Lubricant is trapped to some degree as the springs are collapsed. The degree of damping action can also be influenced by the oil viscosity, clearance grooves, and spring geometry.

The previous methods of adjusting the spring settings, i.e. pre-load for shock absorbers and hammer-anvil gap settings for impact tools, involved tool disassembly and spring adjustment by the use of various width spacers. The present invention provides a more convenient and accurate method of adjusting the position and/or pre-load of a spring system used in shock absorbers or impact-type drilling tools. The need to adjust the impact tool operating load varies with the weight run on the drill bit. This load may require numerous tool settings as different formations are encountered. The ability to adjust the tool of the present invention externally eliminates the need of tool disassembly.

Figure 2:
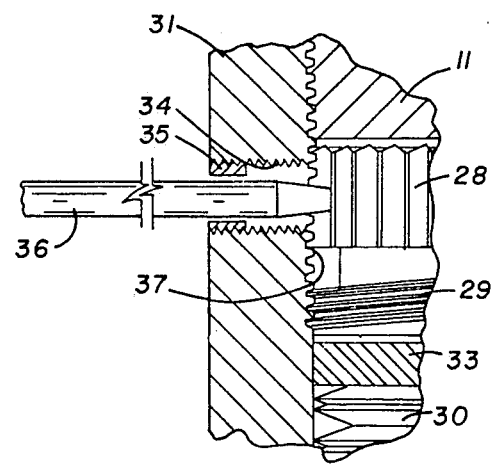
FIG. 2 is an enlarged view of a portion of the drill string tool shown in FIG. 1.

Referring now to FIGS. 1 and 2, the system for adjusting the spring position and/or spring pre-load will be described. The tool 10 includes a traveling nut 28 located in the spring sub 31. The traveling nut 28 has an integral gear wheel 29 which is exposed to a threaded section 37 of the spring sub 31. The traveling nut 28 and integral gear wheel 29 engage a universal spacer 33 which in turn engage the spring system 30. It will be appreciated that rotation of the gear wheel 29 will cause axial travel of the universal spacer 33 and produce the desired positioning and/or pre-load of the spring system 30.

Rotation of the traveling nut 28 is accomplished by removing a sealed, threaded plug 32 from the access opening 34, installing a threaded bushing 35 to protect the access hole threads during adjustment and engaging the nut 28 with a flat or round-end pry bar 36 which allows for sufficient leverage to rotate the nut 28 for proper positioning. The traveling nut 28 may be provided with a gear type head to facilitate rotation with the pry bar 36. A pre-calculated tabulation will reveal the amount of rotation of traveling nut 28 and gear wheel 29 in order to advance or retract the universal spacer 33 to the proper position. After achieving the proper adjustment, the threaded bushing 35 is removed and the sealed, threaded plug 32 is installed to close the access opening 34 and engage the nut 28 in order to lock it in place.

The embodiments of the invention in which an exclusive property or privilege is claimed are defined as follows:

1. A method of earth boring, comprising the steps of:
providing a torque transmitting well tool having an outer member, an inner member with said outer member and said inner member being telescopically arranged, an upper seal between said outer member and said inner member, a lower seal between said outer member and said inner member, a fluid between said upper seal and said lower seal, spline means between said outer member and said inner member for transmitting torque, spring means connected with said outer member and connected with said inner member with said spring means including a multiplicity of disc spring units, a central passage extending through said well tool, and connection means for connecting said well tool to drill pipe;
providing a threaded spring adjustment member connected with said disc spring units for axial movement in said well tool upon relative rotation;
providing a removable plug in said well tool to provide access to said threaded spring adjustment member and to seal said well tool from loss of said fluid;
removing said plug;
rotating said threaded spring adjustment member with an adjustment tool until the desired change of position of said disc spring units has been accomplished;
replacing said plug; and
connecting said well tool to drill pipe for rotation and earth boring.

2. A torque transmitting well tool, comprising:
a torque transmitting well tool body having an outer member;
an inner member, said outer member and said inner member being telescopically arranged;
an upper seal between said outer member and said inner member;
a lower seal between said outer member and said inner member;
a fluid between said upper seal and said lower seal;
spline means between said outer member and said inner member for transmitting torque;
spring means connected with said outer member and connected with said inner member, said spring means including a multiplicity of disc spring units, a central passage extending through said well tool;
connection means for connecting said well tool to drill pipe;
a threaded spring adjustment member connected with said disc spring units for axial movement in said well tool body upon relative rotation;
a passage through said well tool body adjacent said threaded spring adjustment member; and
a removable plug in said passage to provide access to said threaded spring adjustment member and to seal said well tool from loss of said fluid.

* * * * *